United States Patent
Suzuki et al.

(10) Patent No.: US 6,930,134 B2
(45) Date of Patent: Aug. 16, 2005

(54) PHOTOCATIONIC POLYMERIZATION INITIATOR AND PHOTOCATIONICALLY POLYMERIZABLE COMPOSITION

(75) Inventors: Takeshi Suzuki, Tokyo (JP); Hideki Kazama, Tokyo (JP)

(73) Assignees: Tokuyama Corporation, Yamaguchi (JP); Tokuyama Dental Corporation, Tokyo (JP)

( * ) Notice: Subject to any disclaimer, the term of this patent is extended or adjusted under 35 U.S.C. 154(b) by 85 days.

(21) Appl. No.: 10/704,604

(22) Filed: Nov. 12, 2003

(65) Prior Publication Data

US 2004/0132853 A1 Jul. 8, 2004

(30) Foreign Application Priority Data

Nov. 12, 2002 (JP) ........................................ 2002-328308

(51) Int. Cl.[7] .............................. C08G 59/68; C08I 3/28
(52) U.S. Cl. ........................... 522/25; 522/31; 522/170; 522/168; 430/280.1; 430/270.1
(58) Field of Search ........................... 522/25, 31, 170, 522/168; 430/269–288.1, 280.1

(56) References Cited

U.S. PATENT DOCUMENTS

| | | | |
|---|---|---|---|
| 3,640,718 A | | 2/1972 | Smith |
| 4,069,054 A | | 1/1978 | Smith |
| 5,055,439 A | * | 10/1991 | Allen et al. .................. 502/158 |
| 5,837,420 A | * | 11/1998 | Aoai et al. ................ 130/270.1 |
| 6,777,160 B2 | * | 8/2004 | Sato et al. ................ 430/270.1 |
| 2004/0186195 A1 | * | 9/2004 | Suzuki et al. .................. 522/31 |

FOREIGN PATENT DOCUMENTS

| | | | |
|---|---|---|---|
| EP | 0 927 726 | | 7/1999 |
| EP | 1422254 | * | 5/2004 |
| JP | 11 263804 | | 9/1999 |

\* cited by examiner

*Primary Examiner*—Susan Berman
(74) *Attorney, Agent, or Firm*—Sherman & Shalloway

(57) ABSTRACT

A photocationic polymerization initiator comprising (A) a photo acid-generating compound and (B) a fused polycyclic aromatic compound, wherein said fused polycyclic aromatic compound has a molecular structure in which a fused aromatic ring is further condensed with a non-aromatic ring, and at least one of the atoms constituting said non-aromatic ring directly bonded to a common atom in the fused aromatic ring and the non-aromatic ring, is a saturated carbon atom, said saturated carbon atom having at least one hydrogen atom. Upon blending the photopolymerizable monomer with the photocationic polymerization initiator, there is obtained a photocationically polymerizable composition having a high sensitivity for the visible light rays, which is useful for dental applications, exhibiting a sufficiently high curing rate and offering sufficient depth of curing upon the irradiation with light for only a short period of time.

6 Claims, No Drawings

PHOTOCATIONIC POLYMERIZATION INITIATOR AND PHOTOCATIONICALLY POLYMERIZABLE COMPOSITION

BACKGROUND OF THE INVENTION

1. Field of the Invention

The present invention relates to a novel photopolymerization initiator that can be favorably used for photoresist materials, printing board materials, hologram materials and dental materials, and to a photopolymerizable composition containing the above photopolymerization initiator.

2. Description of the Related Art

There have heretofore been proposed a variety of photocationic polymerization initiators that generate Bronsted acid or Lewis acid, and that polymerize cationically polymerizable compounds such as epoxide or vinyl ether.

As such photocationic polymerization initiators, there can be exemplified photo acid-generating compounds such as iodonium salt compound and sulfonium salt compound. However, these photo acid-generating compounds do not usually absorb light in the near-ultraviolet region and cannot, hence, excite the polymerization reaction even by using an ordinary source of light (370 to 550 nm) such as halogen lamp. It has therefore been attempted to use a fused polycyclic aromatic compound having a substituent, such as alkoxy group, aralkyloxy group or acyloxy group as a sensitizing agent in combination with the photo acid-generating compound, so that it works as a photocationic polymerization initiator (see, for example, Non-Patent Documents 1 to 3, and Patent Documents 1 to 5). There has further been proposed the use of these fused polycyclic aromatic compounds in combination with a thioxanthone derivative.

There have also been known photo acid-generating compounds which, by themselves, absorb light in the near-ultraviolet to visible light regions, such as cyclopentadienyl/iron/allene complex, and diazonium salt compound (see, for example, Non-Patent Document 1).

Non-Patent Document 1;
  Ao Yamaoka, Gentaro Matsunaga, "Photopolymer Technology", Nikkan Kogyo Shimbunsha, pp. 38–46
Non-Patent Document 2;
  The Society of Polymer Science, Japan, "Synthesis/Reaction of polymer (1), Synthesis of addition polymerized polymer", Kyoritsu Shuppan Co., pp. 400–404
Non-Patent Document 3;
  Kazuhiko Morio, Hiroshi Tsuchiya, Tsuyoshi Endo, "Modern Progress of Photo-Initiated Cationic Polymerization", Functional Material, CMC Co., Oct., 1985, pp. 5–13
Patent Document 1;
  Japanese Unexamined Patent Publications (Kokai) No. 11-199681
Patent Document 2;
  Japanese Unexamined Patent Publications (Kokai) No. 11-322952
Patent Document 3;
  Japanese Unexamined Patent Publications (Kokai) No. 2000-7716
Patent Document 4;
  Japanese Unexamined Patent Publications (Kokai) No. 2001-81290
Patent Document 5;
  Japanese Unexamined Patent Publications (Kokai) No. 11-263804

In the field of dental materials, on the other hand, there has been widely employed a radically polymerizable system using a (meth)acrylate-type polymerizable monomer as applied to a variety of products. For the dental applications, it is a widely accepted practice to conduct the polymerization by using visible rays by taking the beneficial/harmful action to the living body into consideration, and there have been practically used a polymerization initiator comprising an combination of α-dicarbonyl compound and an aromatic amine, as well as a polymerization initiator comprising an acylphosphine oxide.

However, the radically polymerizing system has a problem in that the polymerization is impaired by oxygen and, besides, volumetric-shrinkage takes place to a large extent due to polymerization. A paste-type dental restorative as represented by a composite resin or a compmer(Polyacid modified resin composite) used for restoring the decay or breakage of natural teeth, is directly filled in a cavity of tooth, shaped and is, then, cured. Therefore, an unpolymerized layer or a lowly polymerized layer is produced in the surface of the cured product as the polymerization is impaired by oxygen. Accordingly, the surface must be polished after curing. When the polishing is not effected, there occurs such a problem in that the cured product is colored or discolored due to aging. Further, since the volumetric shrinkage undergoes to a large extent due to the polymerization, there develops a gap in the interface relative to the dentin, causing the falling of the restorative or the secondary decaying due to the infiltration of bacteria to the gap.

The cationic polymerization is superior to the radical polymerization from such a standpoint that the polymerization is not impaired by oxygen. In particular, when a compound that undergoes the ring-opening-polymerization is used as a polymerizable monomer, the problem of volumetric shrinkage due to the polymerization greatly decreases.

In the above-mentioned system comprising the photo acid-generating compound and the sensitizer, however, the rate of polymerization is low and the depth of curing is not sufficient. Therefore, this system does not fully work as a dental polymerization initiator for effecting the curing to a sufficient degree within a short period of time for the therapy in the oral cavity.

A system that absorbs light in the near-ultraviolet to visible ray region as a photo acid-generating compound, is not still usable for the dental applications. For example, a cyclopentadienyl/iron/allene complex is strongly colored after curing while a diazonium salt compound form bubbles.

In recent years, there have been proposed several cationic polymerization initiators for dental use improving the above-mentioned defects. For example, by using an α-dicarbonyl compound that is a known radical polymerization initiator in combination with an iodonium salt compound, a mixture of the epoxide and the hydroxy compound can be cured by the irradiation with visible rays to provide improved depth of curing (see, for example, Patent Document 6). Upon further combining the α-dicarbonyl compound/iodonium salt compound with aromatic amines, further, it has been reported that the curing rate can be further improved (see, for example, Patent Documents 7 and 8).

However, these cationic polymerization initiators don't exhibit a sufficient activity of polymerization and are practically used.

Patent Document 6;
  International Patent Publication No. 10-508067
Patent Document 7;
  Japanese Unexamined Patent Publication (Kokai) No. 11-130945
Patent Document 8;
  International Patent Publication No. 2002-500172

SUMMARY OF THE INVENTION

It is an object of the present invention to provide a photocationic polymerization initiator which has a high sensitivity to the irradiation with light and, particularly, to visible light rays that are used in the dental applications, and which can be cured at a rate and to a depth of a sufficient degree by the irradiation with light for only a short period of time, as well as to provide a photocationically polymerizable composition which uses the above photocationic polymerization initiator and which shows low volumetric shrinkage by polymerization without impairment by the polymerization by oxygen.

In order to solve the above problems, the present inventors have conducted keen study, have discovered that a composition containing a photo acid-generating compound and a particular fused polycyclic aromatic compound is useful as a novel photopolymerization initiator for achieving the above object, and have finished the present invention.

Namely, according to the present invention, there is provided a photocationic polymerization initiator comprising (A) a photo acid-generating compound and (B) a fused polycyclic aromatic compound, wherein said fused polycyclic aromatic compound has a molecular structure in which a fused aromatic ring is further condensed with a non-aromatic ring, and at least one of the atoms constituting said non-aromatic ring directly bonded to a common atom in said fused aromatic ring and said non-aromatic ring, is a saturated carbon atom, said saturated carbon atom having at least one hydrogen atom.

DETAILED DESCRIPTION OF THE INVENTION (A) Photo Acid-generating Compounds.

The photo acid-generating compound (A) used for the photocationic polymerization initiator of the present invention directly generates a Bronsted acid or a Lewis acid upon the irradiation with ultraviolet rays, and there can be used any known compound without limitation.

A variety of photo acid-generating compounds have been described in the above-mentioned prior technical literatures. Concrete examples include a diaryliodonium salt compound, a sulfonium salt compound, a sulfonic acid ester compound, and a halomethyl-substituted-S-triazine derivative.

Among the above-mentioned photo acid-generating compounds, the diaryliodonium salt is best suited for the present invention on account of its particularly high polymerization activity.

A representative diaryliodonium salt compound is expressed by the following general formula (1),

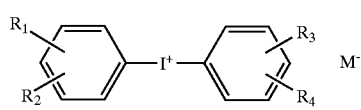

(1)

wherein $R_1$, $R_2$, $R_3$ and $R_4$ are, independently from each other, hydrogen atoms, halogen atoms, alkyl groups, aryl groups, alkenyl groups, alkoxy groups, aryloxy groups or nitro groups, M- is a halide ion, p-toluene sulfonato ion, perfluoroalkyl sulfonato ion, tetrafluoroborate ion, tetrakispentafluorophenyl borate ion, tetrakispentafluorophenyl garlate ion, hexafluorophosphate ion, hexafluoroarsenato ion or hexafluoroatimonate ion.

Concrete examples of the diaryliodonium salt represented by the above general formula (1) include chloride, bromide, p-toluene sulfonato, trifluoromethane sulfonato, tetrafluoroborate, tetrakis(pentafluorophenyl)borate, tetrakis pentafluorophenyl garlate, hexafluorophosphate, hexafluoroarsenato and hexafluoroantimonate of the following diaryliodonium.

Examples of Diaryliodonium Forming Salts:

Diphenyl iodonium, bis(p-chlorophenyl)iodonium, ditolyl iodonium, bis(p-tert-butylphenyl)iodonium, p-isopropylphenyl-p-methylphenyl iodonium, bis(m-nitrophenyl)iodonium, p-tert-butylphenylphenyl iodonium, p-methoxyphenylphenyl iodonium, bis(p-methoxyphenyl) iodonium, p-octyloxyphenylphenyl iodonium, and p-phenoxyphenylphenyl iodonium.

Among the above diaryl iodonium salts according to the present invention, it is desired to use p-toluene sulfonato, perfluoroalkyl sulfonato (e.g., trifluoromethane sulfonato), tetrafluoroborate, tetrakispentafluorophenyl borate, tetrakispentafluorophenyl garlate, hexafluorophosphate, hexafluoroarsenato, and hexafluoroantimonate on account of their solubility in monomer. Among them, it is most desired to use hexafluoroantimonate, tetrakispentafluorophenyl borate, and tetrakispentafluorophenyl garlate on account of their low nucleophilic properties.

In the present invention, further, examples of the sulfonium salt compound preferably used as the photo acid-generating compound in addition to the above-mentioned diaryl iodonium salts, include salts of sulfonium, such as dimethylphenacyl sulfonium, dimethylbenzyl sulfonium, dimethyl-4-hydroxyphenyl sulfonium, dimethyl-4-hydroxynaphthyl sulfonium, dimethyl-4,7-dihydroxynaphthyl sulfonium, dimethyl-4,8-dihydroxynaphthyl sulfonium, triphenyl sulfonium, p-tolyldiphenyl sulfonium, p-tert-butylphenyldiphenyl sulfonium and diphenyl-4-phenylthiophenyl sulfonium, which may be chloride, bromide, p-toluene sulfonato, trifluoromethane sulfonato, tetrafluoroborate, tetrakispentafluorophenyl borate, tetrakispentafluorophenyl garlate, hexafluorophosphate, hexafluoroarsenato and hexafluoroantimonate.

Concrete examples of the sulfonic acid ester compound include benzoin tosylate, α-methylolbenzoin tosylate, o-nitrobenzyl p-toluene sulfonato, and p-nitrobenzyl-9,10-diethoxyanthracene-2-sulfonato. Concrete examples of the halomethyl substituted-S-triazine derivative include 2,4,6-tris(trichloromethyl)-S-triazine, 2-methyl-4,6-bis(trichloromethyl)-S-triazine, 2-phenyl-4,6-bis(trichloromethyl)-S-triazine, and 2-methyl-4,6-bis(tribromomethyl)-S-triazine.

In the present invention, the above photo acid-generating compounds may be used in one kind or being mixed together in two or more kinds.

There is no particular limitation on the amount of using the photo acid-generating compound provided it is used in an amount enough for initiating the polymerization by the irradiation with light. In order to conduct the polymerization at a suitable rate while obtaining various properties (e.g., weatherability and hardness) of the cured material, however, it is desired that the photo acid-generating compound is used in an amount of 0.001 to 10 parts by mass and, more preferably, 0.05 to 5 parts by mass per 100 parts by mass of the cationically polymerizable monomer that will be described later.

(B) Fused Polycyclic Aromatic Compounds.

In the photocationically polymerizable initiator of the present invention, the fused polycyclic aromatic compound (B) used in combination with the photo acid-generating compound is a sensitizer having a molecular structure in which a fused aromatic ring is further fused with a non-aromatic ring, and at least one of the atoms constituting the non-aromatic ring directly bonded to a common atom in the fused aromatic ring and the non-aromatic ring, is a saturated carbon atom. Besides, the saturated carbon atom has at least one hydrogen atom. Use of the fused polycyclic aromatic compound having the above molecular structure makes it possible to improve the activity of polymerization.

The effect of the present invention is not obtained even by using a compound in which the fused aromatic ring has not been further fused with the non-aromatic ring but which is constituted by the aromatic ring only. Even in case the fused aromatic ring is further fused with the non-aromatic ring, the effect of the present invention is not obtained when hydrogen atom is possessed by none of the atoms (hereinafter often referred to simply as "atoms neighboring the ring-fusion atoms") constituting the non-aromatic ring directly bonded to the common atoms (ring-fusion atoms) in the fused aromatic ring and the non-aromatic ring, or when the atoms constituting the non-aromatic ring are the atoms (i.e., atoms having an unsaturated bond) other than the saturated carbon atoms. That is, the effect of the present invention is not obtained when the atoms neighboring the ring-fusion atoms are all saturated carbon atoms forming a group such as a dichloromethylene group or a dimethylmethylene group without at all having hydrogen atom, or are unsaturated carbon atoms having a double bond (or triple bond), or are atoms (such as oxygen atoms or nitrogen atoms) other than carbon atoms.

Even when a ring (e.g., single benzene ring, etc.) which is not a fused aromatic ring is fused with the non-aromatic ring, the activity of polymerization is not improved and the effect of the present invention is not obtained.

In the above-mentioned fused polycyclic aromatic compound, the atoms neighboring the ring-fusion atoms need not all be the saturated carbon atoms having at least one hydrogen atom, but some of a plurality of atoms neighboring the ring-fusion atom may be other than carbon atoms, may be carbon atoms without at all having hydrogen atom, or may be unsaturated carbon atoms. Atoms constituting the non-aromatic ring (except a common atom in the fused polycyclic aromatic ring) other than the atoms neighboring the ring-fusion atoms, are free from the above-mentioned limitation, and may be atoms of any kind or in any state.

In the present invention, the fused aromatic ring may have any known structure. From the standpoint of solubility in monomers, polymerization activity and easy availability, however, it is desired that the fused aromatic ring is the one in which 2 to 6 benzene rings are fused. Concrete examples of the fused aromatic ring include a naphthalene ring in which two benzene rings are fused; an anthracene ring or a phenanthrene ring in which three benzene rings are fused; a naphthacene ring, a 1,2-benzanthracene ring, a chrysene ring or a pyrene ring in which four benzene rings are fused; a benzo (a) pyrene ring, a benzo (e) pyrene ring, a benzo (g) pyrene ring, a benzo (h) pyrene ring, a benzo (i) pyrene ring, a perylene ring, a pentacene ring, a pentaphene ring or a picene ring in which five benzene rings are fused; and a hexaphene ring and a hexacene ring in which six benzene rings are fused.

In the fused polycyclic aromatic compound (B) used in the present invention, the above fused aromatic ring is further condensed with the non-aromatic ring. Namely, the fused polycyclic aromatic compound has a structure in which a total of three or more rings inclusive of at least two rings (which are fused together) exhibiting aromatic property and at least one non-aromatic ring, are fused together. There is no particular limitation on a form in which the fused aromatic ring is further fused with non-aromatic ring. The form of fusion may be an ortho fusion sharing a side of the fused aromatic ring and of the non-aromatic ring, or an ortho-peri fusion sharing two or more sides of the fused aromatic ring and of the non-aromatic ring. For example, a 1,2,3,4-tetrahydrophenanthrene in which a side a of a naphthalene and a cyclohexane are fused together, corresponds to the former fusion, and a 2,3-dihydrophenalene in which two sides d and e of the naphthalene and the cyclohexane are fused together, corresponds to the latter fusion.

As the non-aromatic ring with which the fused aromatic ring is to be further fused, there is no particular limitation provided at least one neighboring atom bonded to a ring-fusion atom (a common atom in the non-aromatic ring and the fused aromatic ring) becomes a saturated carbon atom having at least one hydrogen atom, and any known non-aromatic ring m ay be used. Further, the non-aromatic ring may be further fused with any other aromatic ring or non-aromatic ring, and may further have various substituents.

Moreover, the fused polycyclic aromatic compound used in the present invention may be fused with a plurality of non-aromatic rings, and may further have a non-cyclic substituent.

As the compound that can be favorably used as the fused polycyclic aromatic compound of the present invention, there can be exemplified the compounds represented by the following general formula (2),

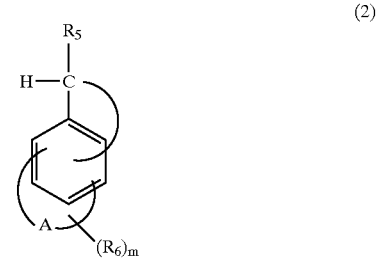

(2)

wherein $R_5$ is a hydrogen atom, a halogen atom, a hydroxyl group, a mercapto group or an organic residue with 1 to 10 carbon atoms, m is an integer of 0 to 6, $R_6$ is a halogen atom, a hydroxyl group, a mercapto group, or a monovalent organic residue having 1 to 10 carbon atoms, or a plurality of $R_6$ may be bonded together to form a non-aromatic ring, and when there are a plurality of $R_6$ or when there are a plurality of non-aromatic rings formed by the bonding of $R_6$, these $R_6$ may be the same or different.

In the general formula (2), further, a group represented by the following formula (3),

(3)

is a fused aromatic hydrocarbon cyclic group having a valency of (m+2) and in which 2 to 6 benzene rings are fused together, and a portion represented by the following formula (4),

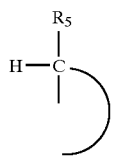

(4)

is the one that is the non-aromatic ring condensed with the fused aromatic hydrocarbon ring and that is not common with the fused aromatic hydrocarbon ring.

As the fused aromatic hydrocarbon cyclic group represented by the above formula (3) in the above formula (2), there can be concretely exemplified a group having a valency of (m+2) derived from the one exemplified as the fused aromatic ring.

The non-aromatic ring having a partial structure represented by the above formula (4) (the remainder thereof is common with the fused aromatic hydrocarbon ring represented the above formula (3)) has at least 3 carbon atoms (at least 2 of them are common with the fused aromatic hydrocarbon ring, and at least one is existing as a saturated carbon atom that is bonded to the fused carbon atom) and, the saturated carbon atom has at least one hydrogen atom. Though there is no particular limitation as far as the above condition is satisfied, the non-aromatic ring preferably has 5 to 7 atoms that constitute a ring (common atoms with the fused aromatic hydrocarbon ring). Further, the non-aromatic ring may be a heterocyclic ring having oxygen atoms, nitrogen atoms or sulfur atoms for constituting the ring.

Concrete examples of the non-aromatic ring which is condensed with the fused aromatic hydrocarbon ring include saturated hydrocarbon rings having 4 to 7 atoms constituting a ring, such as cyclobutane ring, cyclopentane ring, cyclohexane ring, cycloheptane ring, cyclooctane ring, cyclopentene ring, cyclohexene ring, and cycloheptene ring; partly unsaturated hydrocarbon rings having 4 to 7 carbon atoms constituting a ring, such as 1,2-cycloheptadiene ring, cyclooctene ring, 1,2-cyclooctadiene ring, and 1,3-cyclooctadiene ring; oxygen-containing saturated heterocyclic rings such as oxetane ring and tetrahydrofurane ring; nitrogen-containing saturated heterocyclic rings such as azetidine ring, tetrahydropyrane ring, pyrrolidine ring and piperadine ring; sulfur-containing saturated heterocyclic rings such as trimethylene sulfide ring, tetrahydrothiophene ring, and tetramethylene sulfide ring; unsaturated heterocyclic rings such as γ-butylolactone ring, δ-velerolactone ring, ε-caprolactone ring, γ-butylolactam ring, δ-velerolactam ring, ε-caprolactam ring; and fused polycyclic rings having 8 to 12 carbon atoms, in which a hydrocarbon ring having 4 to 7 atoms constituting a ring is further fused with other rings, such as 1,2,3,4,5,6,7,8-octahydronaphthalene ring, benzocyclopentane ring, benzocyclohexane ring or benzocycloheptane ring. (The names of these rings comply with the nomenclature of when they have not been fused with the fused aromatic hydrocarbon ring, and the names of the rings are changed after fused.)

The non-aromatic rings may have, as $R_5$ in the above formula (2), a hydroxyl group, a mercapto group, a halogen atom, or a monovalent organic residue having 1 to 10 carbon atoms, or may have, as a substituent, a hydroxyl group, a mercapto group, a halogen atom or a monovalent organic residue having 1 to 10 carbon atoms at other positions of the ring. There may be further fused other-aromatic and/or non-aromatic rings.

In the group $R_5$ in the formula (2), examples of the halogen atom include fluorine atom, chlorine atom, bromine atom and iodine atom. There is no particular limitation on the monovalent organic residue having 1 to 10 carbon atoms, and there can be exemplified a substituted or unsubstituted alkyl group, a substituted or unsubstituted alkenyl group, a substituted or unsubstituted acyloxy group, a substituted or unsubstituted alkoxy group, a substituted or unsubstituted alkylthio group, a substituted or unsubstituted aryl group, and a dialkylamino group. As the unsubstituted alkyl group, there can be exemplified alkyl groups having 1 to 10 carbon atoms, such as methyl group, ethyl group, propyl group, isopropyl group, butyl group, sec-butyl group, t-butyl group, pentyl group, isopentyl group and hexyl group.

There is no particular limitation on the substituent in the above substituted alkyl group, and examples of the substituent include alkoxy groups such as methoxy group and ethoxy group; aryl groups such as phenyl group and tolyl group; 1-alkenyl groups such as vinyl group and 1-propenyl group; hydroxyl group; halogen atoms such as fluorine atom, chlorine atom and bromine atom; acyloxy groups such as acetyloxy group and benzoyloxy group; alkylthio groups such as ethylthio group and butylthio group; and mercapto group.

As the unsubstituted alkenyl group, there can be exemplified a vinyl group and a 1-propenyl group. As the substituent that may be possessed by the above alkenyl group, there can be exemplified the same substituents as those exemplified concerning the above alkyl group. As the unsubstituted acyloxy group, there can be exemplified an acetyloxy group, a propionyloxy group and a benzoyloxy group. As the substituents that may be possessed by the acyloxy group, there can be exemplified the same substituents as those exemplified concerning the above alkyl group.

As the substituted or unsubstituted alkoxy group and as the substituted or unsubstituted alkylthio group, there can be exemplified alkoxy groups and alkylthio groups derived from the above substituted or unsubstituted alkyl groups.

As the substituted or unsubstituted aryl group, there can be exemplified a phenyl group and a tolyl group, and as the dialkylamino group, there can be exemplified a dimethylamino group and a diethylamino group.

In the present invention, the group $R_5$ in the formula (2) is, particularly desirably, a hydrogen atom.

It is further desired that the non-aromatic ring to be condensed is a saturated or partly unsaturated hydrocarbon ring from the standpoint of easy synthesis and easy availability. Most desirably, the non-aromatic ring is a hydrocarbon ring having 5 to 7 atoms constituting a ring (inclusive of common atoms with the fused aromatic hydrocarbon ring) or a fused polycyclic hydrocarbon ring having 8 to 12 carbon atoms, in which the above hydrocarbon ring is further condensed with a hydrocarbon ring.

The above non-aromatic ring is further condensed with the above fused aromatic hydrocarbon ring to share a plurality of carbon atoms (common atoms) thereby to form a fused polycyclic aromatic compound used in the present invention. Though there is no particular limitation on the number of carbon atoms that are in common, the fusion is desirably the ortho fusion or the ortho-peri fusion sharing 2 to 3 carbon atoms. When the non-aromatic ring is to be condensed with the fused aromatic hydrocarbon ring, at least one of the atoms constituting the non-aromatic ring and directly bonding to the common atoms with the fused polycyclic aromatic ring, must become a saturated carbon atom having at least one hydrogen atom (i.e., active hydrogen). That is, the carbon atom represented by >CHR$_5$ in the above general formula (2) must be so condensed as to be directly bonded to the fused aromatic hydrocarbon ring represented by the above formula (3).

In the above formula (2), further, the substituent R$_6$ which can be bonded to the fused aromatic hydrocarbon ring is a hydroxyl group, a mercapto group, a halogen atom or a monovalent organic residue having 1 to 10 carbon atoms. Further, a plurality of substituents R$_6$ may be bonded together to form a non-aromatic ring. As the halogen atom or the monovalent organic residue having 1 to 10 carbon atoms, there can be exemplified those that were concretely exemplified above concerning the group R$_5$. When the plurality of groups R$_6$ are forming the non-aromatic ring, then, the ring may assume a form in which it is condensed with a ring similar to the non-aromatic ring of which the partial structure was exemplified by the above formula (4). In this case, the neighboring atoms bonded to the ring-fusion atoms (common atoms) between the non-aromatic ring which the plurality of R$_6$ are forming and the fused aromatic ring, need not all be the saturated carbon atoms having a hydrogen atom. Namely, in the non-aromatic ring formed by the plurality of R$_6$, the atoms neighboring the ring-fusion atoms may all be the atoms other than the carbon atoms or may all be the unsaturated carbon atoms, or may be the saturated carbon atoms substituted by halogen atoms or alkyl groups so will not to leave hydrogen atoms.

Further, when there are a plurality of the groups R$_6$ or when the groups R$_6$ are forming a plurality of non-aromatic rings, the groups R$_6$ or the rings may be the same or different.

In the dental application, a high activity must be exhibited by the irradiation with visible rays by using a dental light irradiator. Among the fused polycyclic aromatic compounds represented by the above formula (2), therefore, it is desired to use those having an absorption peak at a wavelength area of not shorter than 350 nm. As the fused aromatic hydrocarbon cyclic group represented by the formula (3), in general, there is used a compound with which three or more benzene rings are linearly condensed exhibiting the absorption peak at a wavelength of not shorter than 350 nm.

Exemplified below are the fused polycyclic aromatic compounds (B) preferably used in the present invention.

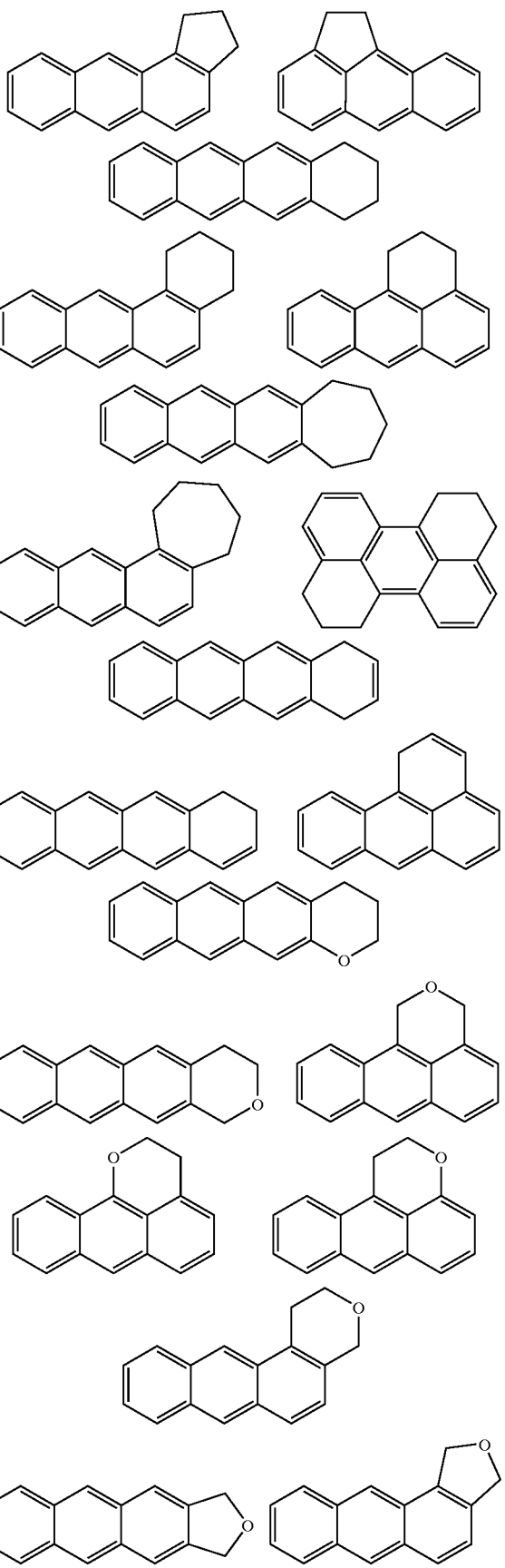

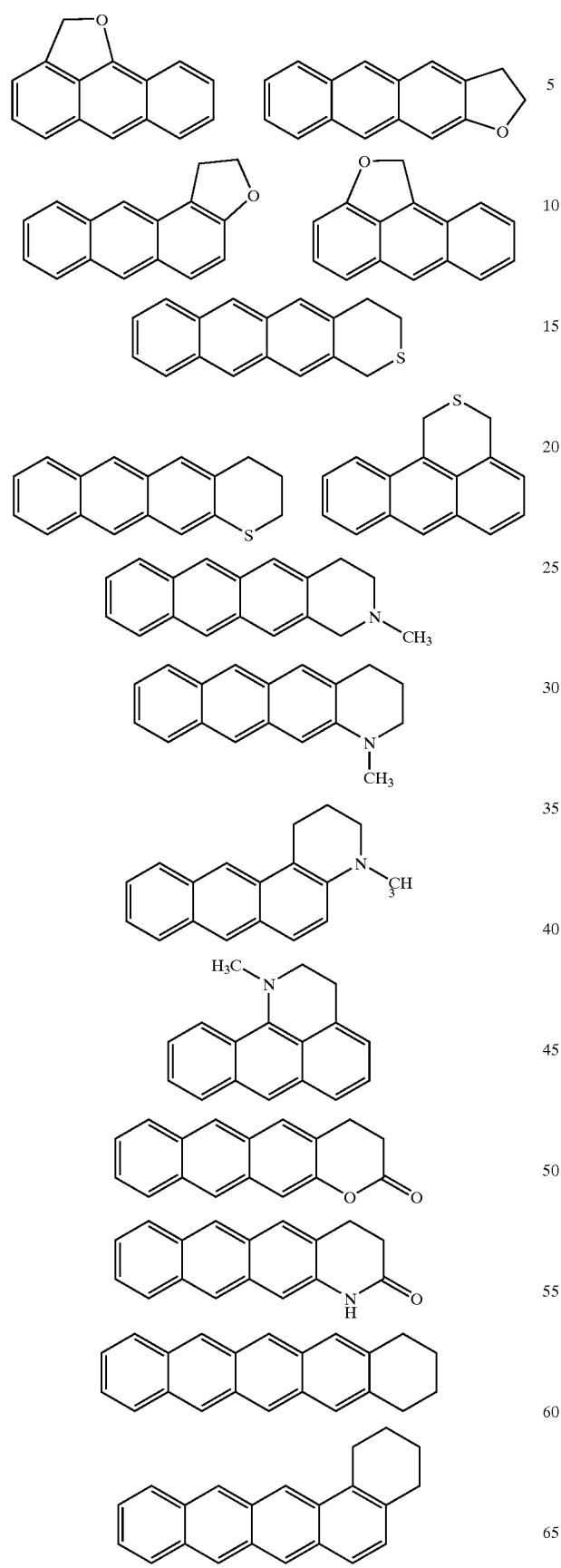
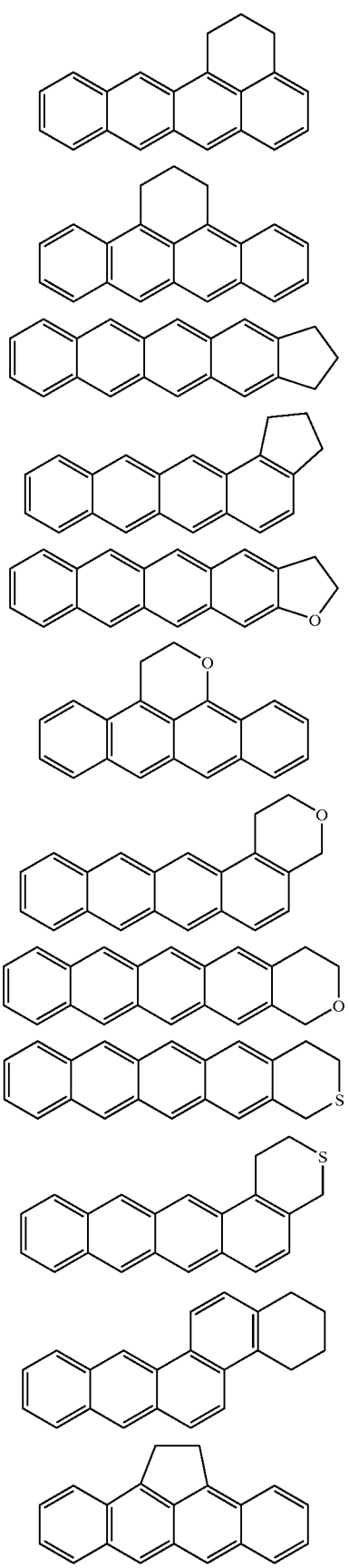

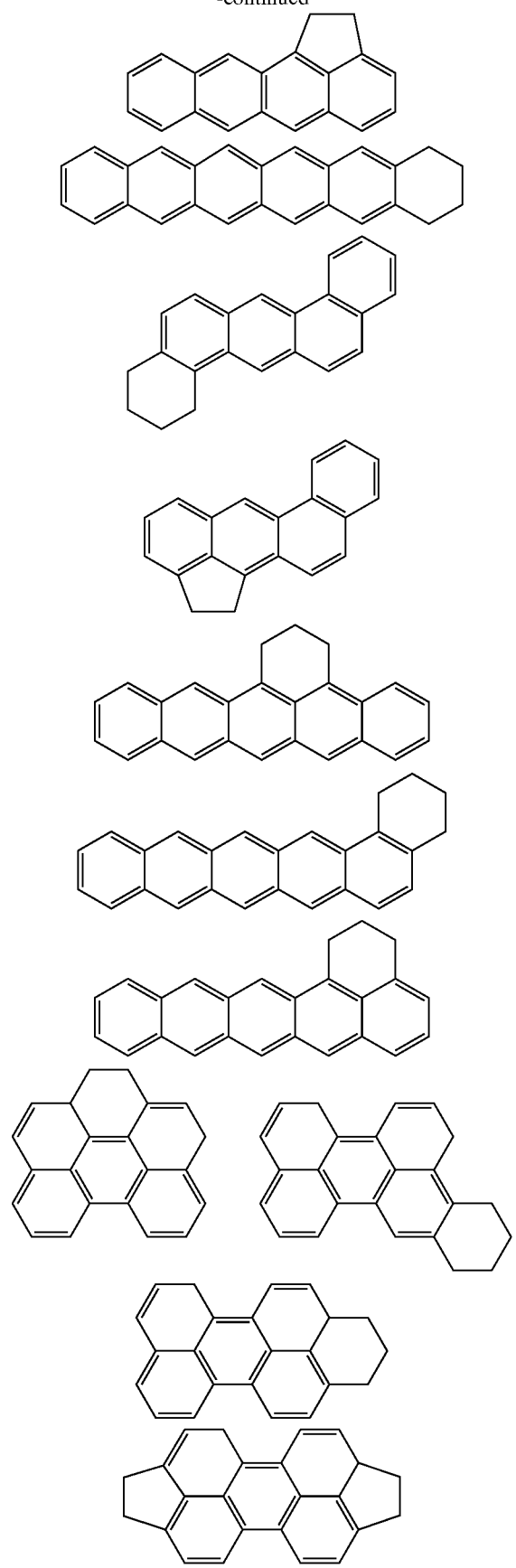

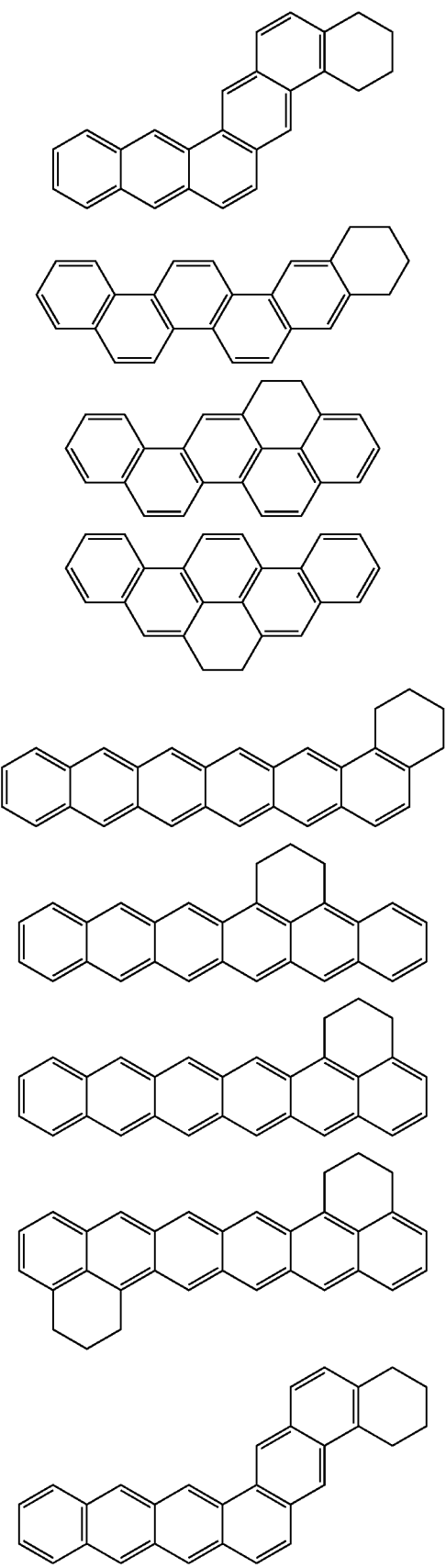

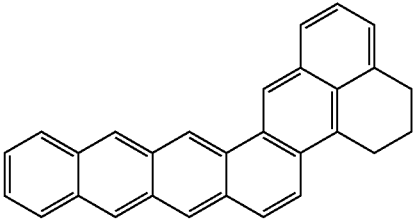

In the present invention, the above fused polycyclic aromatic compounds can be used in a single kind or in two or more kinds being mixed together.

The amount of addition of the fused polycyclic aromatic compound varies depending upon the kind of the photo acid-generating compound but is, usually, 0.001 to 20 mols and, particularly, 0.005 to 10 mols per mol of the photo acid-generating compound (A).

(Photocationically Polymerizable Composition)

In the present invention, the photocationic polymerization initiator comprising the photo acid-generating compound (A) and the fused polycyclic aromatic compound (B) is mixed into a cationically polymeriable monomer so as to be used as a photocationically polymerizable composition.

As the cationically polymerizable monomer, there can be used a known monomer that has been known to undergo the cationic polymerization without any limitation. Such compounds have been closely described in the above-mentioned prior technical literatures and in the literatures quoted therein. Concrete examples of a representative cationically polymerizable monomer include a vinyl ether compound, an epoxy compound, an oxetane compound, an aziridine compound, an azetidine compound, an episulfide compound, a cyclic acetal, a bicycloortho ester, a spiroortho ester, a spiroortho carbonate and a tetrahydrofurane. When the dental applications are taken into consideration, in particular, it is desired to use the oxetane compound and the epoxy compound, since they are easily available, contract little in volume, and undergo a quick polymerization reaction.

Concrete examples of the oxetane compound include those compounds having one oxetane ring, such as trimethylene oxide, 3-methyl-3-oxetanyl methanol, 3-ethyl-3-oxetanyl methanol, 3-ethyl-3-phenoxymethyl oxetane, 3,3-diethyl oxetane, and 3-ethyl-3-(2-ethylhexyloxy) oxetane; compounds having two or more oxetane rings, such as 1,4-bis(3-ethyl-3-oxetanylmethyloxy)benzene, 4,4'-bis(3-ethyl-3-oxetanylmethyloxy)biphenyl, 4,4'-bis(3-ethyl-3-oxetanylmethyloxymethyl)biphenyl, ethylene glycol bis(3-ethyl-3-oxetanylmethyl)ether, diethylene glycol bis(3-ethyl-3-oxetanylmethyl)ether, bis(3-ethyl-3-oxetanylmethyl) diphenoate, trimethylolpropanetris(3-ethyl-3-oxetanylmethyl)ether, pentaerythritoltetrakis(3-ethyl-3-oxetanylmethyl)ether, as well as compounds represented by the following formulas,

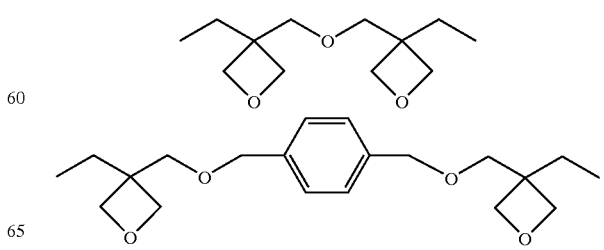

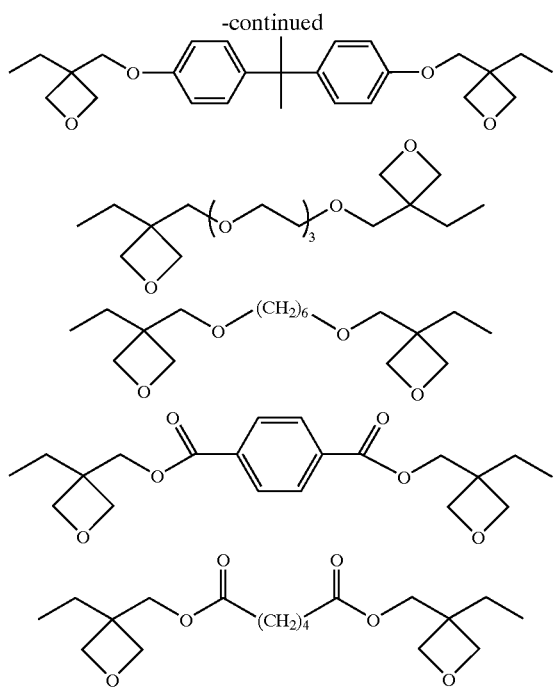

In the present invention, there are used those compounds having two or more oxetane rings in one molecule of the monomer from the standpoint of properties of the obtained cured material.

Examples of the epoxy compound that can be preferably used as the cationically polymerizable monomer include diglycerolpolydiglycidyl ether, pentaerythritolpolyglycidyl ether, 1,4-bis(2,3-epoxypropoxyperfluoroisopropyl) cyclohexane, sorbitolpolyglycidyl ether, trimethylolpropanepolyglycidyl ether, resorcindiglycidyl ether, 1,6-hexanedioldiglycidyl ether, polyethylene glycol diglycidyl ether, phenylglycidyl ether, p-tert-butylphenylglycidyl ether, diglycidyl adipate ester, o-diglycidyl phthalate ester, dibromophenylglycidyl ether, 1,2,7,8-diepoxyoctane, 4,4'-bis(2, 3-epoxypropoxyperfluoroisopropyl)diphenyl ether, 2,2-bis [4-glycidyloxyphenyl]propane, 3,4-epoxycyclohexylmethyl-3',4'-epoxycyclohexane carboxylate, 3,4-epoxycyclohexyloxysilane, and ethylene glycol-bis(3,4-epoxycyclohexane carboxylate).

These cationically polymerizable monomers can be used alone or in a combination of two or more kinds.

The polymerizable composition containing the cationic monomer is blended with the above-mentioned photocationic polymerization initiator. Here, as described earlier, it is desired that the photocationic polymerization initiator is blended in such an amount that the amount of the photo acid-generating compound is 0.001 to 10 parts by mass and, particularly, 0.05 to 5 parts by mass per 100 parts by mass of the cationically polymerizable monomer.

The photocationically polymerizable composition of the present invention can-be further blended with various cationic polymerization initiators in addition to those described above. There is no particular limitation on other cationic polymerization initiators that are used in combination. Their concrete examples include boron trifluoride ether complex, titanium tetrachloride, aluminum trichloride, p-toluenesulfonic acid, trifluoromethanesulfonic acid, hydrochloric acid, sulfuric acid, perchloric acid, iodine, iodine bromide and triphenylmethylhexafluoroantimonato.

The photocationically polymerizable composition of the present invention can be further blended with a radically polymerizable monomer in addition to the cationically polymerizable monomer.

Examples of the radically polymerizable monomer that can be preferably utilized include (meth)acrylate monomers such as methyl(meth)acrylate, glycidyl(meth)acrylate, 2-cyanomethyl(meth)acrylate, polyethylene glycol mono(meth)acrylate, allyl(meth)acrylate, 2-hydroxyethylmono(meth)acrylate, ethylene glycol di(meth)acrylate, diethylene glycol di(meth)acrylate, triethylene glycol di(meth)acrylate, nonaethylene glycol di(meth)acrylate, propylene glycol di(meth)acrylate, dipropylene glycol di(meth)acrylate, 2,2-bis[4-(meth)acryloyloxyethoxyphenyl]propane, 2,2-bis[4-(meth)acryloyloxyethoxyethoxyphenyl]propane, 2,2-bis{4-[3-(meth)acryloyloxy-2-hydroxypropoxy]phenyl}propane, 1,4-butanedioldi(meth)acrylate, 1,3-hexanedioldi(meth) acrylate, urethanedi(meth)acrylate, and trimethylolpropanedi(meth)acrylate; fumaric acid ester monomers such as monomethyl fumarate, diethyl fumarate, and diphenyl fumarate; styrenes or α-methylstyrenes such as styrene, divinylbenzene, α-methylstyrene, α-methylstyrene dimer; and allyl compounds such as diallyl phthalate, diallyl terephthalate, diallyl carbonate and allyldiglycol carbonate. These radically polymerizable monomers can be used alone or in a combination of two or more kinds.

The amount of blending the radically polymerizable monomer may be selected depending upon the object, but is, preferably, in a range of 0 to 200 parts by mass per 100 parts by mass of the cationically polymerizable monomer. In blending the radically polymerizable monomer, it is desired to blend, as a polymerization initiator, a radical polymerization initiator and, particularly, a photoradical polymerization initiator separately from the above-mentioned photocationic polymerization initiator compound (A).

As the photoradical polymerization initiator, there can be exemplified benzoinalkyl ethers such as benzoinmethyl ether, benzoinethyl ether, and benzoinpropyl ether; α-diketones such as camphorquinone and benzyl; and acylphosphineoxides such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)phenylphoshine oxide. The α-diketones and acylphosphine oxides exhibit photopolymerizing activity even when they are used alone, but exhibit further enhanced activity when they are used in combination with an amine compound such as ethyl 4-dimethylaminobenzoate, lauryl 4-dimethylaminobenzoate or dimethylaminoethyl methacrylate, which is desirable.

There can be further used a photoradical polymerization initiator of the type of aryl borate compound/pigment/photo acid-generating compound disclosed in Japanese Unexamined Patent Publication (Kokai) No. 9-3109.

The above photoradical polymerization initiator may be blended in a known amount or, concretely, in an amount of 0.01 to 20 parts by mass and, preferably, about 0.05 to about 5 parts by mass per 100 parts by mass of the radically polymerizable monomer.

As the radical polymerization initiator other than the photoradical polymerization initiator, there can be used, as thermoradical polymerization initiator, peroxides such as benzoyl peroxide, p-chlorobenzoyl peroxide, tert-butylperoxy-2-ethyl hexanoate, tert-butylperoxy dicarbonate and diisopropylperoxy dicarbonate; azo compounds such as azobisisobutylonitrile; and boron compounds such as tributylborane, partial oxide of tributylborane, sodium tetraphenylborate, sodium tetrakis(p-fluorophenyl)borate and potassium tetrakis(p-chlorophenyl)borate.

The above radical polymerization initiators may be added alone or may be added in a combination of a plurality of kinds thereof, as required.

The photocationically polymerizable composition of the present invention by itself is useful as a surface coating material or an adhesive. Upon adding a filler thereto, further, the volumetric shrinkage upon the polymerization very decreases, and the composition becomes highly useful as a dental material and, particularly, as a filling restorative (composite resin) for dental use.

As the filler, there can be used, without any particular limitation, a known filler that has been generally used for the dental composite resins. The fillers can generally be roughly divided into organic fillers and inorganic fillers.

Concrete examples of a representative organic filler that can be preferably used include polymethyl methacrylate, polyethyl methacrylate, methyl methacrylate/ethyl methacrylate copolymer, crosslinked polymethyl methacrylate, crosslinked polyethyl methacrylate, ethylene/vinyl acetate copolymer, styrene/butadiene copolymer, acrylonitrile/styrene copolymer, and acrylonitrile/styrene/butadiene copolymer, which can be used in one kind or as a mixture of two or more kinds.

Concrete examples of a representative inorganic filler include quartz, silica, alumina, silica titania, silica zirconia, lanthanum glass, barium glass, strontium glass and various cation-eluting fillers. As the cation-eluting filler, there can be exemplified hydroxides such as calcium hydroxide and strontium hydroxide, and oxides such as zinc oxide, silicate glass and fluoroaluminosiliate glass. The inorganic fillers, too, may be used in one kind or being mixed together in two or more kinds. Use of the inorganic filler containing a heavy metal such as zirconia contributes to imparting X-ray contrast property.

It is further allowable to use a granular organic/inorganic composite filler obtained by adding a polymerizable monomer to the inorganic fillers to obtain a paste thereof and, then, polymerizing and pulverizing the paste.

It is further allowable to use the above organic filler, inorganic filler and organic/inorganic composite filler in a suitable combination.

There is no particular limitation on the particle size and shape of the filler. The filler having an average particle size of 0.01 $\mu$m to 100 $\mu$m, that is usually used as a dental material, can be suitably used depending on the object. There is no particular limitation, either, on the refractive index of the filler; i.e., the filler having a refractive index of 1.4 to 1.7 as possessed by dental fillers, in general, can be used without any limitation.

The ratio of blending the filler may be suitably determined depending upon the object of use by taking into consideration the viscosity (operability) of when it is mixed into the polymerizable monomer and the mechanical properties of the cured material. In general, however, the filler is blended in a range of 50 to 1500 parts by mass and, preferably, 70 to 1000 parts by mass per 100 parts by mass of the polymerizable monomer.

As required, further, the photocationically polymerizable composition of the invention may be blended with a known additive. Examples of the additive include polymerization inhibitor, antioxidant, ultraviolet ray-absorbing agent, dye, antistatic agent, pigment and perfume.

As required, further, there may be added an organic solvent and a viscosity-imparting agent. As the organic solvent, there can be exemplified hexane, heptane, octane, toluene, dichloromethane, methanol, ethanol and ethyl acetate. As the viscosity-imparting agent, there can be exemplified high molecular compounds such as polyvinyl pyrrolidone, carboxymethyl cellulose and polyvinyl alcohol.

The above compounds are weighed out in predetermined amounts and are suitably mixed together to obtain a photopolymerizable composition of the present invention.

As means for curing the photopolymerizable composition of the present invention, there can be used such light sources as carbon arc, xenon lamp, metal halide lamp, tungsten lamp, fluorescent lamp, sunlight, helium-cadmium laser or argon laser without any limitation. The time of irradiation varies depending upon the wavelength of the source of light, intensity, shape and material of the cured material and may, hence, be determined in advance by preparatory experiment. In general, however, it is desired to adjust the rate of blending various components such that the time of. irradiation lies in a range of about 5 to about 60 seconds.

The invention will now be concretely described by way of Examples to which only, however, the invention is in no way limited. Described below are the compounds and their abbreviations used in the specification and in Examples.

(A) Photo Acid-Generating Compounds:

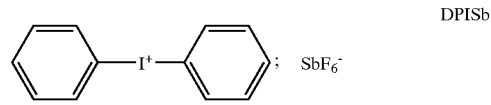
DPISb

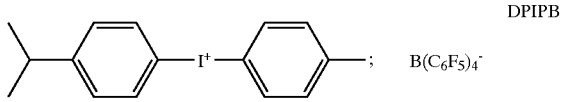
DPIPB

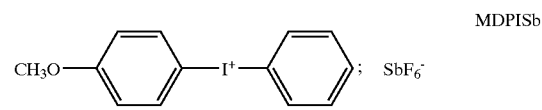
MDPISb

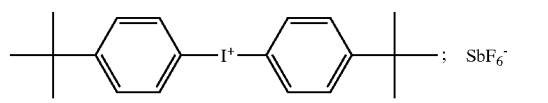
BDPISb

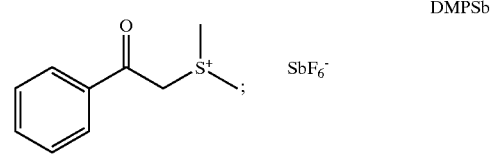
DMPSb (B) Fused Polycyclic Aromatic Compounds:
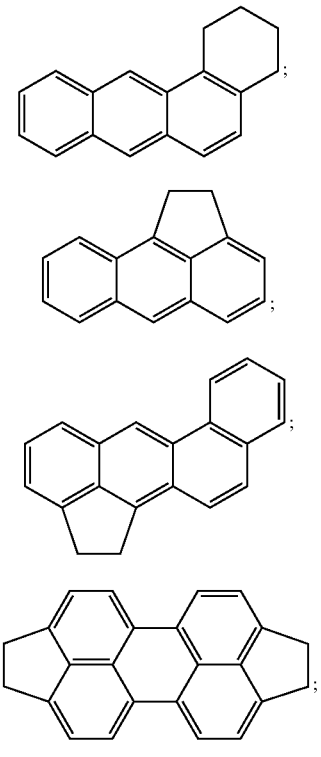
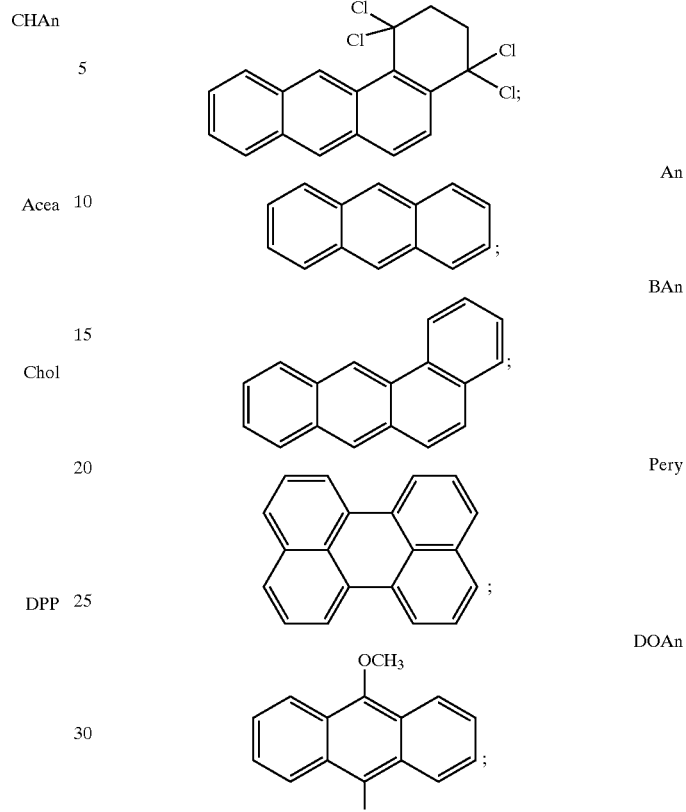
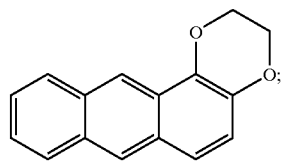
(Note: DOXAn, TCHAn, An, BAn, Pery and DOAn are not the fused polycyclic aromatic compounds used in the present invention)
(C) Cationically Polymerizable Monomers.
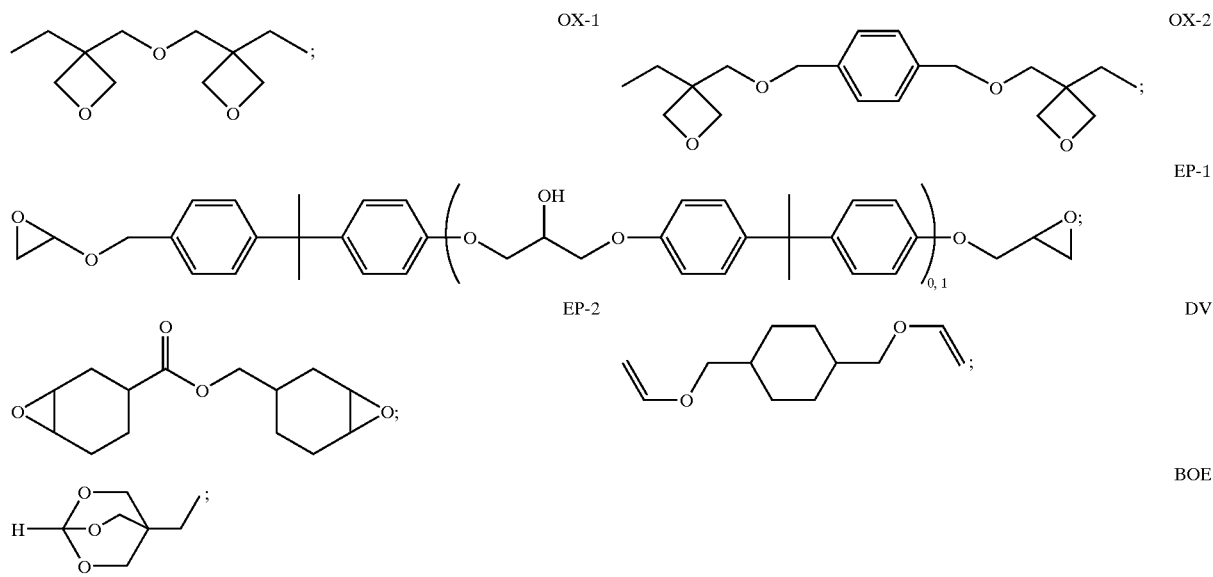

(D) Others.

CQ: Camphorquinone

DMBE: Ethyl N,N-dimethylaminobenzoate

Described below are the methods of evaluating properties of the materials appearing in the specification and in Examples.

(1) Gelling Time

A cationically polymerizable monomer solution containing a photocationic polymerization initiator of the present invention was introduced, in an amount (about 1.5 to 1.6 grams) forming a cured thick film of 10 mm, into a sample tube (volume=6 ml, inner diameter=1.6 cm). Then, by using a dental light irradiator (TOKUSO POWER LITE, manufactured by Tokuyama Co.), light was irradiated from an irradiation distance of 0.5 cm (distance between the irradiating position and the surface of the solution). Here, the time in which the monomer ceased to flow was regarded to be a gelling time.

(2) Curing Property 1.6 Grams of the solution was introduced into the 6-ml sample tube in the same manner as in the above method, and was irradiated with light for 2 minutes to evaluate the hardness of the cured material in four steps depending upon the presence of unpolymerized portions. That is, the samples having a sufficient degree of hardness without unpolymerized portion (liquid, jelly-like or rubbery portion) were denoted by ⊚, the samples containing unpolymerized portions but having a cured depth that was partly reaching 10 mm were denoted by ●, the samples that were partly cured but having cured depths that were not reaching 10 mm were denoted by Δ, and the samples that were partly gelled but that were mostly liquid or were not at all cured were denoted by X.

(3) Cured Depth 1.6 Grams of the solution was introduced into the 6-ml sample tube in the same manner as in the above method, and was irradiated with light for 2 minutes. After irradiation with light, the sample tube was broken to take out the cured material, and a portion where the cured depth was the smallest was measured and was regarded to be the cured depth.

(4) Bending Strength/flexural Modulus of Elasticity

A curable composition was filled in a metal mold measuring 2×2×25 mm, and was irradiated with light for 1.5 minutes by using the light irradiator so as to be cured. The cured material was preserved at 37° C. overnight. By using an autograph (manufactured by Shimazu Seisakusho Co.), the cured materials each in a number of five were measured for their three-point bending strengths and flexural moduli of elasticity maintaining a distance between fulcrums of 20 mm at a crosshead speed of 0.5 mm/min, and their average values were calculated.

(5) Coefficient of Volumetric Shrinkage by Polymerization

A plunger made of SUS having a diameter of 3 mm and a height of 4 mm was introduced into a split mold made of SUS having a hole of a diameter of 3 mm and a height of 7 mm, such that the height of the hole was 3 mm. A curable composition was filled therein, and a polypropylene film was brought into pressed contact therewith from the upper side. The composition was placed on a glass plate equipped with a dental irradiator with the film surface faced downward and, then, a probe capable of measuring fine motion of the needle was brought into contact therewith from above the SUS plunger. The composition was cured by polymerization by using the dental irradiator, and a volumetric shrinkage [%] 10 minutes after the start of irradiation was calculated from the distance of motion of the probe in the up-and-down direction.

(6) Unpolymerized Surface

The curable composition was placed in a state of being contacted to the air, and was irradiated with light for one minute using the dental irradiator. The surfaces of the cured materials that were sticky due to being not polymerized were denoted by X, and the surfaces without stickiness were denoted by ○.

EXAMPLES 1 TO 19

To 100 parts by mass of the cationically polymerizable monomers shown in Table 1, there were added 0.2 parts by mass of the photo acid-generating compounds and 0.05 parts by mass of the fused polycyclic aromatic compounds shown in Table 1, which were then dissolved in a dark place. The gelling times, curing properties and the cured depths of the solutions were as shown in Table 1. In all Examples, the solutions were quickly gelled exhibiting favorable curing properties.

Comparative Examples 1 and 2

To 100 parts by mass of OX-1, there were added 0.2 parts by mass of the photo acid-generating compound and 0.05 parts by mass of the fused polycyclic aromatic compounds shown in Table 1, which were then dissolved in a dark place to take the measurement in the same manner as in Examples 1 to 19. The gelling times, curing properties and the cured depths were as shown in Table 1.

In Comparative Examples 1 and 2, there were used fused polycyclic aromatic compounds in which atoms bonded to the ring-fusion atoms (common atoms of the non-aromatic ring and the fused aromatic ring) were not the saturated carbon atoms having hydrogen atom, instead of using the fused polycyclic aromatic compound (B) which is one of the essential components of the present invention. In all Comparative Examples, light had to be irradiated for extended periods of time until gelling took place and, besides, cured depths were not sufficient. Comparative Examples 3 to 5

To 100 parts by mass of OX-1, there were added 0.2 parts by mass of the photo acid-generating compound and 0.05 parts by mass of the fused polycyclic aromatic compounds shown in Table 1, which were then dissolved in a dark place to take the measurement in the same manner as in Examples 1 to 19. The gelling times, curing properties and the cured depths were as shown in Table 1.

In Comparative Examples 3 to 5, there were used fused polycyclic aromatic compounds which had not been substituted, instead of using the fused polycyclic aromatic compound (B) which is one of the essential components of the present invention. In all Comparative Examples, light had to be irradiated for extended periods of time until gelling took place and, besides, cured depths were not sufficient. Comparative Example 6

To 100 parts by mass of OX-1, there were added 0.2 parts by mass of the photo acid-generating compound and 0.05 parts by mass of the fused polycyclic aromatic compound shown in Table 1, which were then dissolved in a dark place to take the measurement in the same manner as in Examples 1 to 19. The gelling time, curing property and the cured depth were as shown in Table 1.

In Comparative Example 6, there was used a fused polycyclic aromatic compound substituted with an alkoxy group, instead of using the fused polycyclic aromatic compound (B) which is one of the essential components of the present invention. Light had to be irradiated for an extended period of time until gelling took place and, besides, the cured depth was not sufficient. Comparative Example 7

To 100 parts by mass of OX-1, there were added 0.2 parts by mass of DPISb, 0.05 parts by mass of CQ and 0.05 parts by mass of DMBE, which were then dissolved in a dark place to take the measurement in the same manner as in Examples 1 to 19. The gelling times, curing properties and the cured depths were as shown in Table 1.

In Comparative Example 7, there were used CQ which is a sensitizing coloring matter and DMBE which is an electron donor. Under the conditions of this Comparative Example, the cured depth of not smaller than 10 mm could not be obtained. Comparative Example 8

To 100 parts by mass of OX-1, there was added 0.05 parts by mass of DPP, which was then dissolved in a dark place to take the measurement in the same manner as in Examples 1 to 19. The gelling time, curing property and the cured depth were as shown in Table 1.

In Comparative Example 8, there was used only a fused polycyclic aromatic compound without photo acid-generating compound. In this case, the curing did not took place at all.

95/5, a solution C by using a mixture of OX-2/DV at a ratio of 95/5, and a solution D by using a mixture of BOE/EP-2 at a ratio of 50/50.

20 Grams of a quartz powder (particle size, 5 $\mu$m) was suspended in 80 ml of an acetic acid aqueous solution of which the pH was adjusted to 4.0, and to which was added 0.8 g of a 3-glycidyloxypropyltrimethoxysilane with stirring. After stirred for one hour, the water was distilled off by using an evaporator. The obtained solid was pulverized in a mortar and was, then, dried under a reduced pressure at 80° C. for 15 hours. After drying, the obtained powder was labeled as an inorganic filler F1.

Similarly, an inorganic filler F2 was prepared by using spherical silica (particle size, 0.2 to 2 $\mu$m) treated with 3-glycidyloxypropyltrimethoxysilane, an inorganic filler F3 was prepared by using spherical silica/zirconia (particle size, 0.4 $\mu$m), an inorganic filler F4 was prepared by using spherical silica/zirconia (particle size, 0.2 $\mu$m), an inorganic filler F5 was prepared by using spherical silica/titania (particle size, 0.1 $\mu$m), and an inorganic filler F6 was prepared by using pulverized silica/zirconia (particle size, 0.5 $\mu$m).

The thus prepared inorganic fillers and the solutions were mixed together in an agate mortar. The mixtures were placed in vacuum to remove bubbles, and curable compositions were obtained. Further, the filler contents with respect to the

TABLE 1

| | Cationically polymerizable monomer | photo acid-generating | Fused polycyclic aromatic compound | Gelling time | Curing property | Cured depth |
|---|---|---|---|---|---|---|
| Example No. | | | | | | |
| 1 | OX-1 | DPISb | CHAn | 24 | ◎ | 10 mm or more |
| 2 | OX-1 | DPIPB | CHAn | 22 | ◎ | 10 mm or more |
| 3 | OX-1 | MDPISb | CHAn | 18 | ◎ | 10 mm or more |
| 4 | OX-1 | BDPISb | CHAn | 18 | ◎ | 10 mm or more |
| 5 | OX-1 | DMPSb | CHAn | 36 | ◎ | 10 mm or more |
| 6 | OX-1 | DPISb | Acea | 24 | ◎ | 10 mm or more |
| 7 | OX-1 | DPISb | Chol | 19 | ◎ | 10 mm or more |
| 8 | OX-1 | DPISb | DPP | 13 | ◎ | 10 mm or more |
| 9 | OX-2 | DPISb | DPP | 14 | ◎ | 10 mm or more |
| 10 | EP-1 | DPISb | DPP | 17 | ◎ | 10 mm or more |
| 11 | EP-2 | DPISb | DPP | 17 | ◎ | 10 mm or more |
| 12 | DV | DPISb | DPP | 8 | ◎ | 10 mm or more |
| 13 | OX-1:EP-1 = 95:5 (wt ratio) | DPISb | DPP | 10 | ◎ | 10 mm or more |
| 14 | OX-2:EP-1 = 95:5 | DPISb | DPP | 12 | ◎ | 10 mm or more |
| 15 | OX-1:EP-2 = 95:5 | DPISb | DPP | 7 | ◎ | 10 mm or more |
| 16 | OX-2:EP-2 = 95:5 | DPISb | DPP | 7 | ◎ | 10 mm or more |
| 17 | OX-1:DV = 95:5 | DPISb | DPP | 10 | ◎ | 10 mm or more |
| 18 | OX-2:DV = 95:5 | DPISb | DPP | 11 | ◎ | 10 mm or more |
| 19 | BOE:EP-2 = 50:50 | DPISb | DPP | 18 | ◎ | 10 mm or more |
| Comp. Ex. No. | | | | | | |
| 1 | OX-1 | DPISb | DOXAn | 39 | ● | 8.1 mm |
| 2 | OX-1 | DPISb | TCHAn | 42 | ● | 8.3 mm |
| 3 | OX-1 | DPISb | An | not gelled | X | could not be measured |
| 4 | OX-1 | DPISb | BAn | 61 | Δ | 4.0 mm |
| 5 | OX-1 | DPISb | Pery | 52 | Δ | 4.4 mm |
| 6 | OX-1 | DPISb | DOAn | 43 | Δ | 5.3 mm |
| 7 | OX-1 | DPISb | CQ/DMBE | 35 | ● | 9.1 mm |
| 8 | OX-1 | — | DPP | not gelled | X | could not be measured |

EXAMPLES 20 TO 25

To 100 parts by mass of a mixture of OX-2/EP-1 at a nass ratio of 95/5, there were dissolved 0.8 parts by mass of DPISb and 0.2 parts by mass of DPP in a dark place to prepare a solution A. There were further similarly prepared a solution B by using a mixture of OX-2/EP-2 at a ratio of curable compositions were expressed by weight ratios and were regarded to be filling rates (%).

Table 2 shows the above curable compositions, bending strengths, flexural moduli of elasticity, volumetric shrinkage by polymerization and unpolymerized surfaces.

TABLE 2

| Example No. | Mass ratio of fillers | Solution | Filling ratio (%) | Bending strength/ MPa (standard deviation) | Flexural modulus of elasticity/GPa (standard deviation) | Contraction by polymerization | Unpolymerized surface |
|---|---|---|---|---|---|---|---|
| 20 | F1:F2 = 60:40 | A | 86 | 150.0(4.2) | 11.3(0.78) | 0.84 | ○ |
| 21 | F1:F2 = 60:40 | B | 86 | 146.2(4.1) | 11.2(0.75) | 0.85 | ○ |
| 22 | F1:F2 = 60:40 | C | 86 | 140.1(4.3) | 11.3(0.61) | 0.88 | ○ |
| 23 | F1:F2 = 60:40 | D | 86 | 108.3(3.5) | 9.4(0.68) | 0.52 | ○ |
| 24 | F3:F5 = 70:30 | A | 82 | 152.4(4.0) | 10.1(0.62) | 0.93 | ○ |
| 25 | F4:F6 = 40:60 | A | 83 | 135.3(3.5) | 10.2(0.65) | 0.9 | ○ |

The photocationic polymerization initiator of the present invention possesses sufficient sensitivity even for the wavelengths in the visible light region, and makes it possible to obtain an increased depth of curing by the irradiation with light in a short period of time even by using a visible light irradiator that has been placed in dental use. Further, the polymerized and cured material thereof exhibits a variety of excellent mechanical properties.

It is further possible to polymerize and cure a cationically polymerizable monomer that is not impaired for its polymerization by oxygen. By using the photopolymerizable composition comprising the photocationic polymerization initiator of the present invention and the cationically polymerizable monomer, therefore, it is made possible to obtain a cured material without unpolymerized layer in the surface even without using any particular means for blocking oxygen. Even when the photopolymerizable composition is polymerized and cured in a place where it is difficult to block oxygen like in an oral cavity, therefore, there are easily obtained favorable properties even without polishing the surfaces.

In general, further, the cationically polymerizable monomer shows less volumetric shrinkage when it is polymerized than the radically polymerizable monomers, and blending the filler further decreases the volumetric shrinkage by polymerization. By using the polymerizable composition as a composit resin for dental use, therefore, excellent sealing is accomplished without developing a gap in the interface between the composite resin and the dentin at the time of polymerization, eliminating the probability of secondary decaying that is caused by the infiltration of bacteria through the gap after the therapy.

What we claim is:

1. A photocationic polymerization initiator comprising (A) a photo acid-generating compound and (B) a fused polycyclic aromatic compound, wherein said fused polycyclic aromatic compound has a molecular structure in which a fused aromatic ring is further condensed with a non-aromatic ring, and at least one of the atoms constituting said non-aromatic ring directly bonded to a common atom in the fused aromatic ring and the non-aromatic ring, is a saturated carbon atom, said saturated carbon atom having at least one hydrogen atom.

2. A photocationic polymerization initiator according to claim 1, wherein the photo acid-generating compound (A) is a diaryl iodonium salt compound.

3. A photocationic polymerization initiator according to claim 1, wherein the fused polycyclic aromatic compound has the fused aromatic ring in which three or more benzene rings are linearly condensed, and has a molecular structure in which said fused aromatic ring is further condensed with the non-aromatic ring.

4. A photocationic polymerization initiator according to claim 1, wherein the fused polycyclic aromatic compound is contained in an amount of 0.001 to 20 mols per mol of the photo acid-generating compound (A).

5. A photocationically polymerizable composition containing a photocationic polymerization initiator of claim 1 and a cationically polymerizable monomer.

6. A photocationically polymerizable composition according to claim 5, wherein the photocationic polymerization initiator is blended in an amount of 0.001 to 10 parts by mass per 100 parts by mass of the cationically polymerizable monomer.

* * * * *